Patented May 23, 1944

2,349,282

UNITED STATES PATENT OFFICE 2,349,282

COLORING OF ORGANIC DERIVATIVES OF CELLULOSE

Jean G. Kern, Buffalo, N. Y., assignor to Allied Chemical & Dye Corporation, a corporation of New York No Drawing. Application February 25, 1939, Serial No. 258,573

16 Claims. (Cl. 8—40)

This invention relates to the coloring of organic derivatives of cellulose. It relates more particularly to improved coloring compositions for use in the coloring of organic derivatives of cellulose, and to the manufacture and use of such compositions.

The compounds that are generally referred to as coloring agents or dyes for materials made of or comprising organic derivatives of cellulose (such as cellulose esters and ethers, of which cellulose acetate is the outstanding example), are usually amine bases, such as amino anthraquinone compounds or amino azo compounds or intermediates for the preparation of the latter. They are ordinarily insoluble in water and, prior to use, must be converted into a well dispersed or "solubilized" form. These dyes and intermediates (hereinafter generically referred to as "organic coloring agents") are frequently applied, for example, in the form of colloidal dispersions prepared with the use of Turkey-red oil, soaps, sulfonates, etc.

An object of the present invention is to provide new coloring compositions for use in the coloring of organic derivatives of cellulose whereby the use of said previously known dispersing agents may be dispensed with.

Another object of this invention is to provide a new method of obtaining dyes and dye intermediates for use in the coloring of organic derivatives of cellulose in the form of compositions from which they may be converted easily to a very finely divided condition merely upon introduction into a dye bath, printing paste or the like.

Other objects of the invention in part will be obvious and in part will appear hereinafter.

In accordance with this invention, compositions of particular value for coloring material made of or containing organic derivatives of cellulose are prepared by dissolving the water-insoluble coloring agent in a water-soluble amide having a melting point of at least 50° C. and preferably above 100° C. By the term amide I mean any compound containing the grouping

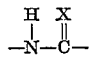

where X may be either an oxygen or a sulfur atom. The water-soluble amide used should be a good solvent for the dye or dye intermediate, and preferably should be soluble in cellulose esters and ethers, although the last requirement is not essential. I have found the dyes and intermediates (coloring agents) above referred to form homogeneous solutions with the amides disclosed herein, and when a melt thereof is cooled a clear solid cake is formed which apparently contains the dye in solid solution. However, it is to be understood the invention is not dependent on the theoretical considerations involved and it may be that the coloring agent is contained in the amide in the form of a very fine dispersion rather than as a true solid solution. In both the specification and the claims when I refer to the coloring agent or dye as "dissolved" in the water-soluble amide, I intend to include compositions of the type described whether they are true solid solutions of the coloring agent or dye in the amide, or fine dispersions thereof in said amide. Similarly, by the term "solid solution" I intend to include both true solid solutions and fine dispersions of the coloring agent in the amide.

I have further found, if the amide is soluble in the cellulose ester or ether being dyed, it will be absorbed on the fiber and thereby render the fiber more receptive to the coloring matter dispersed in the bath. The amide preferably should have a melting point over 100° C. in order to avoid any difficulties which might arise in the usual grinding or other manipulation of the dye compositions. However, amides melting between 50° C. and 100° C. may be used to advantage under suitable conditions, as, for example, grinding in admixture with solid carbon dioxide as set out in United States Patent 2,098,798 to I. T. Thornton.

I have also discovered that coloring agents having a relatively acidic character (e. g., those containing an aromatic hydroxyl group) are advantageously dissolved in an amide of a relatively basic character (e. g., urea); while coloring agents of a relatively basic character (e. g., those containing an amino group) are best dissolved in an amide of a relatively acidic or neutral character (e. g., amides of fatty acids, such as acetamide or diacetamide).

In the preparation of the coloring compositions of the present invention in accordance with the one method of procedure, the amide to be used as the solvent is melted and coloring agent, preferably in a finely-ground form, is gradually added to the melt, with continuous agitation, until a homogeneous solution is obtained. The ratio of the dye to the amide is regulated by the former's solubility in the latter and also by the accepted strength of standard products. The melt is allowed to cool and harden into a solid mass, which is then broken up, ground and standardized with suitable diluents.

As an alternative method, the finely-ground coloring agent may be mixed with the water-soluble amide; the whole mass dissolved in a suitable volatile organic solvent (such as alcohol), for example, by heating with refluxing; thereafter the volatile solvent removed by gradually heating the mass; and the resulting melt allowed to cool. A composition containing the coloring agent dissolved in the amide is obtained which may be ground and treated as described above.

For use of the compositions of the present invention in the coloring of organic derivatives of cellulose, the coloring compositions comprising the coloring agent dissolved in the amide is added, preferably in a comminuted condition, to a dye bath or printing composition. The water-soluble amide dissolves and the coloring agent is precipitated in an extremely finely-divided form capable of dyeing material made of or containing organic derivatives of cellulose without the aid of additional emulsifying or dispersing agents. In the case of certain amides and/or coloring agents, the state of subdivision may be such that the dye bath appears to be a true solution of the coloring agent.

For example, for the dyeing of cellulose acetate and related organic derivatives of cellulose, the material to be dyed is immersed in the bath in the usual manner and dyeing is directly effected. For the coloring of organic derivatives of cellulose by the formation of a dye in the fiber in accordance with the usual development process, the dye intermediate (a suitable aromatic amine or aminoazo compound i. e. a diazotizable aromatic amine base which is an intermediate for developed azo dyestuffs for said cellulose derivatives) in the form of a solution in a water-soluble amide of the present invention is applied to the fiber in a similar manner and is then developed to give the shade desired in the well-known manner, by diazotization of the amine base on the fiber and treatment with an azo coupling component.

My process is especially featured by not requiring the use of any added dispersing or solubilizing agent during the dyeing or printing operation. When the dye or dye intermediate is precipitated in the bath, it is in an extremely fine state of subdivision and the agitation caused by the fabrics or skeins in motion is quite sufficient to insure a uniform dispersion of the dye particles in the bath and thereby produce an even dyeing. However, it is to be understood that fatty and soap-like substances, dispersing and wetting out agents, etc. may be used in conjunction with these dye compositions, if desired, without departing from the invention.

The dye compositions of this invention also may be used to color organic solvents, oils, resins, lacquers, etc.

The preferred amides to be used as solvents according to this invention fall into two general classes. The first class is represented by the general formula:

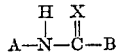

wherein A represents a member of the group consisting of hydrogen and alkyl, aryl, aralkyl, and acyl groups; B represents a member of the group consisting of alkyl, aryl, and aralkyl groups; and X represents a member of the group consisting of oxygen and sulfur. For purposes of illustration, the following compounds falling within this general class may be mentioned: acetamide, diacetamide, thiacetamide, and benzamide. Of these the water-soluble amides of fatty acids are of particular value.

The second class of preferred amides is represented by the general formula:

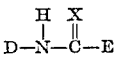

wherein D represents a member of the group consisting of hydrogen and alkyl, aryl, and aralkyl groups; E represents a member of the group consisting of amino and alkyl-, aryl- and aralkyl-substituted amino groups; and X represents a member of the group consisting of oxygen and sulfur. For purposes of illustration, the following compounds falling within this class may be mentioned: urea, thiourea, ethyl urea, and diethyl urea.

The following examples are given to illustrate my invention. The parts are by weight:

EXAMPLE 1

200 parts of acetamide are melted and when completely liquefied, 50 parts of dry, powdered 1,4-diaminoanthraquinone are added with continuous agitation until complete solution of the dye in the acetamide is obtained. Upon cooling, a purple crystalline cake is obtained which is then ground into a fine powder (160 mesh screens).

The product thus obtained is dissolved in hot water and diluted to the proper dye bath concentration. "Celanese" yarn (cellulose acetate) is then introduced into the bath and worked for ½ hour at temperatures varying from 50° to 75° C. At the end of this time the "Celanese" is dyed a beautiful purple. The depth of shade is regulated by the amount of the dye composition. A 4 per cent dyeing (on the weight of the yarn) with the product obtained above yields a full bright violet.

Instead of acetamide, any one of the amides given in the appended list may be used; furthermore, the ratio of 1,4-diaminoanthraquinone to the water-soluble amide may be varied from 1:4 to 1:10 by weight.

Instead of 1,4-diaminoanthraquinone, any one of the usual anthraquinone coloring matters may be used.

EXAMPLE 2

40 parts by weight of the product obtained according to Example 1 are dissolved in 20 parts of monoethyl ether of ethylene glycol and 320 parts of hot water are added. 520 parts of a textile gum thickener are then added and the whole is worked into a smooth printing paste by proper stirring. Cellulose acetate fabrics are printed therewith, steamed from 20 minutes to 1 hour with moist steam under 5 pounds pressure, then washed, soaped, rinsed, and dried. A full violet shade of great brilliancy and excellent penetration is thus obtained.

The following table is given as illustrating other specific compositions which may be similarly prepared and used in accordance with this invention:

*Table 1*

| Dye | Water soluble amide | Weight ratio of dye to amide | Shade on cellulose acetate |
|---|---|---|---|
| 1-amino-2-methyl-anthraquinone. | Acetamide | 1:5 | Orange. |
| 1,4-diaminoanthraquinone. | Diacetamide | 1:4 | Violet. |
| 1-amino-4-chloranthraquinone. | Succinimide | 1:3 | Orange. |
| 1-amylamino-4-methylaminoanthraquinone. | Thiacetamide | 1:4 | Blue. |
| Phenyl-azo-phenyl-methylpyrazolone. | Glycolamide | 1:8 | Golden yellow. |
| 4-chlor-2-nitro-diphenylamine. | Glycol urea | 1:4 | Orange. |
| 1-ethylamino-4-hydroxyanthraquinone. | Ethyl urea | 1:3 | Purple. |
| 1-amylamino-4-hydroxyanthraquinone. | Thiacetamide | 1:3 | Red (self shade). |
| 1-amino-4-hydroxyanthraquinone. | Diethyl urea | 1:6 | Red. |

The following table is given to illustrate compositions prepared from dye intermediates according to my invention:

Table 2

| Dye intermediate | Water soluble compound | Ratio of dye to amide | Diazotized developed shade |
|---|---|---|---|
| Amino-azo benzene base. | Butyramide | 1:9 | m-Toluene-diamine—Red. |
| Dianisidine | Benzoyl glycine | 1:5 | 2,3-hydroxy-naphthoic acid—Blue. |
| 4-amino-4'-dimethylamino-azobenzene. | ...do... | 1:3 | 2,3-hydroxy-naphthoic acid—Black. |

In addition to the dyes listed above, other dyestuffs of a similar nature have been found to be suitable for the practice of this invention, among them being Quinoline Yellow Base, 1,4-dimethyl-diazoaminoanthraquinone, Oil Yellow 2681 (color index 17), 1-ethylamino-4-methylaminoanthraquinone, 1-hydroxyethylamino-4-methylaminoanthraquinone, 1-benzylamino-4-methylaminoanthraquinone, and 1-benzylamino-4-hydroxyanthraquinone. As examples of other dye intermediates which may be used according to this invention, metachlortoluidine and 4'-methoxy-4-aminodiphenylamine may be mentioned.

In addition to the high melting solvents mentioned in the above examples, the following have been found suitable for the practice of this invention: Acetanilide, aceto-acetanilide, 1,3-acetaminophenol, acetaniside, acetyl biuret, acetyl glycine, acetyl taurine, acetyl thiourea, acetyl urea, benzamide, benzyl thiourea, biuret, dicyandiamide (Param), dimethyl-oxamide, dimethylurea, diphenylurea, ethylidene urethane:

$$C_2H_4(NH.CO.O.C_2H_5)_2,$$

formanilide, hydroxy-benzamide, hydroxyurea, iso-butyric acid amide, malonic amide, methyl-acetyl urea, methyl urea, m-nitro-acetanilide, oxalyl urea ($C_3H_2O_3N_2$), propionamide, pyrazolone, salicylamide (o), salicylanilide, semi-carbazide, succinamide, thiourethane, toluamide, and urethane.

I claim:

1. A composition in the solid form for coloring organic derivatives of cellulose, organic solvents, oils, resins, lacquers, and the like, comprising a solid solution of a water-insoluble organic coloring agent selected from the class consisting of dyestuffs for organic derivatives of cellulose and diazotizable aromatic amine bases which are intermediates for developed azo dyestuffs for said cellulose derivatives, in a water-soluble amide having a melting point of at least 50° C.

2. A composition in the solid form for coloring organic derivatives of cellulose, organic solvents, oils, resins, lacquers, and the like, comprising a solid solution of one part of a water-insoluble organic coloring agent selected from the class consisting of dyestuffs for organic derivatives of cellulose and diazotizable aromatic amine bases which are intermediates for developed azo dyestuffs for said cellulose derivatives, in at least 3 parts, by weight, of a water-soluble amide having a melting point of at least 50° C. and having the general formula:

$$\begin{array}{c} H \quad X \\ | \quad \| \\ A-N-C-B \end{array}$$

wherein A represents a member of the group consisting of hydrogen and alkyl, aryl, aralkyl and acyl groups; B represents a member of the group consisting of alkyl, aryl, and aralkyl groups; and X represents a member of the group consisting of oxygen and sulfur.

3. A composition in the solid form for coloring organic derivatives of cellulose, organic solvents, oils, resins, lacquers, and the like, comprising a solid solution of one part of a water-insoluble organic coloring agent selected from the class consisting of dyestuffs for organic derivatives of cellulose and diazotizable aromatic amine bases which are intermediates for developed azo dyestuffs for said cellulose derivatives, in at least 3 parts, by weight, of a water-soluble amide of a fatty acid, said amide having a melting point of at least 50° C.

4. A composition in the solid form for coloring organic derivatives of cellulose, organic solvents, oils, resins, lacquers, and the like, comprising a solid solution of one part of a water-insoluble organic coloring agent selected from the class consisting of dyestuffs for organic derivatives of cellulose and diazotizable aromatic amine bases which are intermediates for developed azo dyestuffs for said cellulose derivatives, in at least 3 parts, by weight, of acetamide.

5. A composition in the solid form for coloring organic derivatives of cellulose, organic solvents, oils, resins, lacquers, and the like, comprising a solid solution of an amino anthraquinone in a water-soluble amide having a melting point of at least 50° C. and having the general formula $$\begin{array}{c} H \quad X \\ | \quad \| \\ A-N-C-B \end{array}$$

wherein A represents a member of the group consisting of hydrogen and alkyl, aryl, aralkyl and acyl groups; B represents a member of the group consisting of alkyl, aryl, and aralkyl groups; and X represents a member of the group consisting of oxygen and sulfur.

6. A composition in the solid form for coloring organic derivatives of cellulose, organic solvents, oils, resins, lacquers, and the like, comprising a solid solution of one part of an amino anthraquinone in 3 to 10 parts by weight of an amide having a melting point of at least 50° C.

7. A composition in the solid form for coloring organic derivatives of cellulose, organic solvents, oils, resins, lacquers, and the like, comprising a solid solution of one part of an amino anthraquinone in 4 to 10 parts by weight of acetamide.

8. A composition in the solid form for coloring organic derivatives of cellulose, organic solvents, oils, resins, lacquers, and the like, comprising a solid solution of one part of a water-insoluble basic organic coloring agent selected from the class consisting of dyestuffs for organic derivatives of cellulose and diazotizable aromatic amine bases which are intermediates for developed azo dyestuffs for said cellulose derivatives, in 3 to 10 parts, by weight, of a water-soluble amide of acidic character which melts above 50° C.

9. A composition in the solid form for coloring organic derivatives of cellulose, organic solvents, oils, resins, lacquers, and the like, comprising a solid solution of one part of a water-insoluble basic organic coloring agent selected from the class consisting of dyestuffs for organic derivatives of cellulose and diazotizable aromatic amine bases which are intermediates for developed azo dyestuffs for said cellulose derivatives, in 3 to 10 parts, by weight, of a water-soluble amide of neutral character which melts above 50° C.

10. A composition in the solid form for coloring organic derivatives of cellulose, organic solvents, oils, resins, lacquers, and the like, comprising a solid solution of one part of a water-insoluble acidic organic coloring agent selected from the class consisting of dyestuffs for organic derivatives of cellulose and diazotizable aromatic amine bases which are intermediates for developed azo dyestuffs for said cellulose derivatives, in 3 to 10 parts, by weight, of a water-soluble amide of basic character which melts above 50° C.

11. The method of preparing compositions in solid form for coloring organic derivatives of cellulose, organic solvents, oils, resins, lacquers, and the like, which comprises dissolving one part of a water-insoluble organic coloring agent selected from the class consisting of dyestuffs for organic derivatives of cellulose and diazotizable aromatic amine bases which are intermediates for developed azo dyestuffs for said cellulose derivatives, in at least 3 parts, by weight, of a water-soluble amide having a melting point of at least 50° C., forming the resulting solution into a solid, and comminuting the solid.

12. The method of preparing compositions in solid form for coloring organic derivatives of cellulose, organic solvents, oils, resins, lacquers, and the like, which comprises melting a water-soluble amide having a melting point of at least 50° C., dissolving therein $\frac{1}{3}$ to $\frac{1}{10}$ of its weight of a water-insoluble organic coloring agent selected from the class consisting of dyestuffs for organic derivatives of cellulose and diazotizable aromatic amine bases which are intermediates for developed azo dyestuffs for said cellulose derivatives, cooling the resulting solution to cause it to solidify, and comminuting the resulting solid solution.

13. The method of preparing compositions in solid form for coloring organic derivatives of cellulose, organic solvents, oils, resins, lacquers, and the like, which comprises melting a water-soluble amide of a fatty acid, said amide having a melting point of at least 50° C., dissolving therein $\frac{1}{3}$ to $\frac{1}{10}$ of its weight of a water-insoluble organic coloring agent selected from the class consisting of dyestuffs for organic derivatives of cellulose and diazotizable aromatic amine bases which are intermediates for developed azo dyestuffs for said cellulose derivatives, cooling the resulting solution to cause it to solidify, and comminuting the resulting solid solution.

14. A method of coloring organic derivatives of cellulose which comprises carrying out the coloring with the aid of a coloring composition containing an amino anthraquinone coloring agent for organic derivatives of cellulose in the form of an aqueous dispersion obtained by dissolving in water a solid solution of the amino anthraquinone coloring agent in a water-soluble amide having a melting point of at least 50° C.

15. A method of dyeing cellulose acetate which comprises carrying out the dyeing in a dye bath containing an amino anthraquinone coloring agent for cellulose acetate in the form of an aqueous dispersion obtained by dissolving in water a solid solution of one part of the amino anthraquinone coloring agent in 4 to 10 parts of a water soluble amide of a fatty acid which has a melting point of at least 50° C.

16. A composition in the solid form for coloring organic derivatives of cellulose, organic solvents, oils, resins, lacquers, and the like, comprising a solid solution of one part of a water-insoluble organic coloring agent selected from the class consisting of dyestuffs for organic derivatives of cellulose and diazotizable aromatic amine bases which are intermediates for developed azo dyestuffs for said cellulose derivatives, in at least 3 parts, by weight, of a water-soluble urea having a melting point of at least 50° C.

JEAN G. KERN.